United States Patent [19]

Hoezee

[11] 4,422,372

[45] Dec. 27, 1983

[54] FOOD EXTRUDER

[75] Inventor: Doug Hoezee, Fremont, Mich.

[73] Assignee: Gerber Products Company, Fremont, Mich.

[21] Appl. No.: 320,288

[22] Filed: Nov. 12, 1981

[51] Int. Cl.³ .............................................. A47J 27/18
[52] U.S. Cl. ...................................... 99/353; 99/406; 99/407; 99/443 C; 241/60; 241/82.5; 425/311; 426/513; 426/516
[58] Field of Search ................. 99/352, 353, 403, 406, 99/404, 407, 405, 443 C, 355; 241/60, 82.1, 82.4, 82.5, 82.7, 38, 39; 425/311, 227, 231; 100/904, 93 S, 73, 112; 426/513, 516, 523

[56] References Cited

U.S. PATENT DOCUMENTS

| | | | |
|---|---|---|---|
| 1,876,064 | 9/1932 | Lang | 100/112 |
| 3,246,594 | 4/1966 | Fisher | 100/904 |
| 3,452,688 | 7/1969 | Spohn | 99/403 |
| 3,536,115 | 10/1970 | Weiler | 241/82.5 |
| 3,615,693 | 10/1971 | Billerbeck | 426/513 X |
| 3,727,308 | 4/1973 | Ross | 426/516 |
| 3,797,376 | 3/1974 | Meyer | 99/353 |
| 3,942,729 | 3/1976 | Fredriksson | 241/38 |
| 4,212,609 | 7/1980 | Fay | 425/231 |
| 4,212,617 | 7/1980 | Bagdan | 425/311 |

*Primary Examiner*—Billy J. Wilhite
*Attorney, Agent, or Firm*—Townsend and Townsend

[57] ABSTRACT

A food extruder wherein an extruder plate has perforations between its inside and outside surfaces and is sandwiched between a food chamber and a fluid housing is disclosed. Food enters the chamber and is passed through the perforations in the extruder plate. A rotary knife within the fluid housing cuts the food into portions of preselected size immediately upon their extrusion. A second rotary knife contained within the food housing clears any food blockage occurring in the vicinity of the interior surface of the extruder plate. Fluid is directed through the fluid housing past the exterior surface of the extruder plate for the purpose conveying food portions thus formed to the next stage in processing in a manner which prevents food portions from adhering either to one another or to elements of the food portion maker.

9 Claims, 2 Drawing Figures

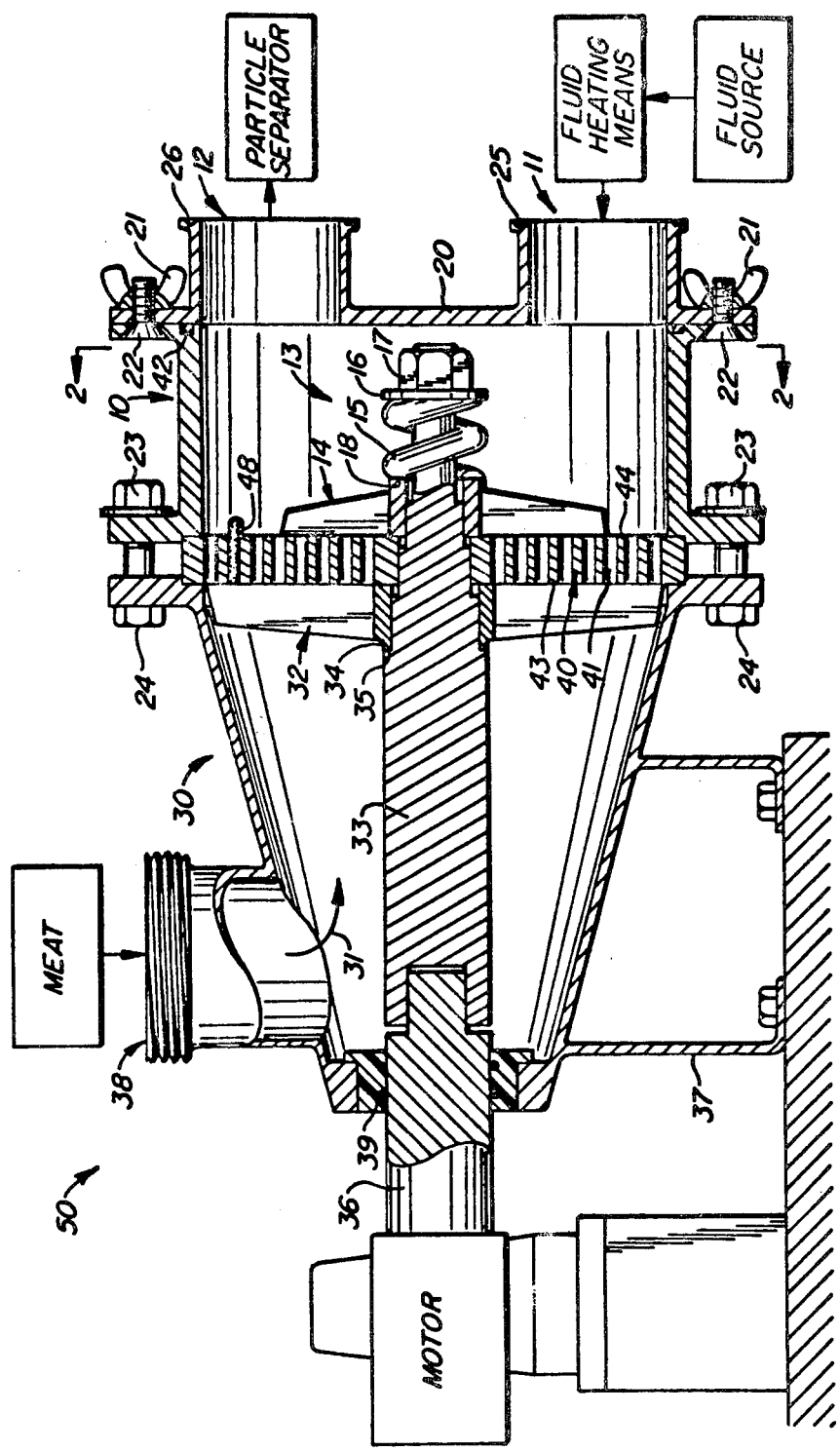
FIG._1.

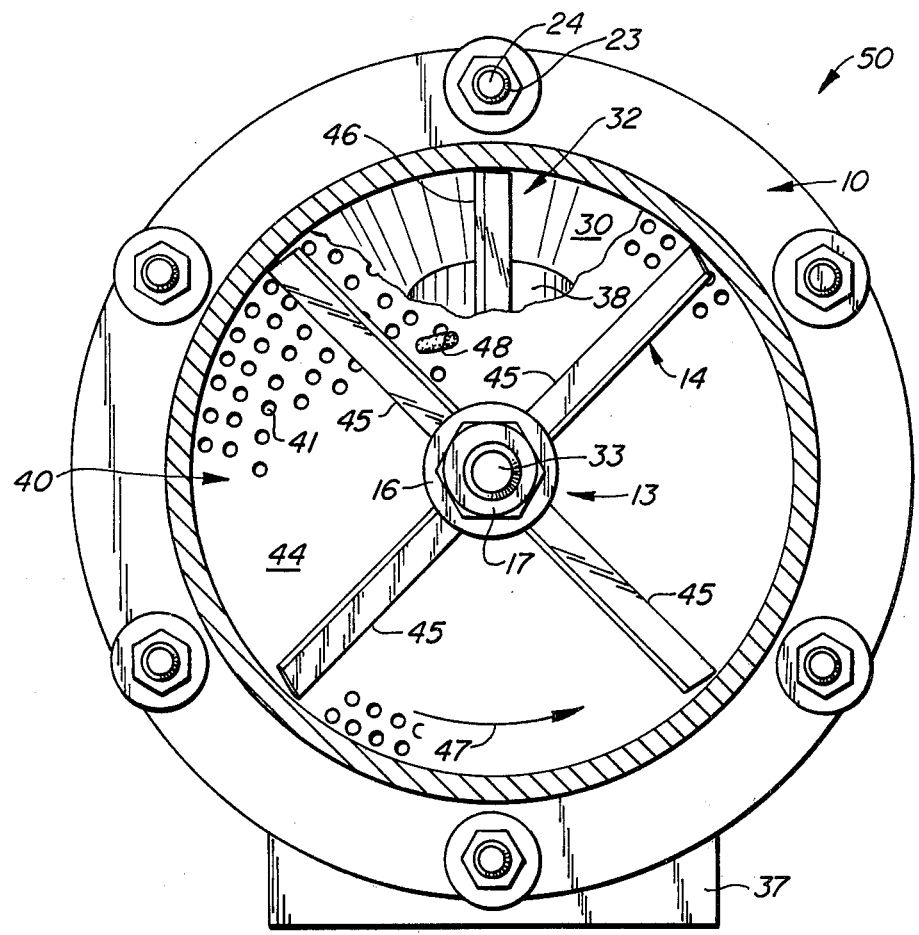
FIG._2.

FOOD EXTRUDER

FIELD OF THE INVENTION

This invention relates to food preparation apparatus, more particularly to a food portion maker or extruder having an extruder plate with dual knives and a fluid conveyer system for heating and transporting processed food.

BACKGROUND OF THE INVENTION

There exists a great demand for food products especially prepared for consumption by young children and physically infirm persons. These individuals are frequently unable to properly chew or otherwise digest certain food products, such as meat, whose natural composition renders such digestion difficult.

U.S. Pat. No. 3,615,693 describes a process for preparing ready-to-eat meat products for this class of consumers. First, naturally occurring raw animal flesh is emulsified, i.e., divided into particles of a size indiscernible to the naked eye. Reduction to this size eliminates the need for strenuous mastication and otherwise facilitates digestion. The meat emulsion thus obtained is then prepared for actual consumption by passing the emulsion through an extruder plate. The extruder has a knife on its outside surface which cuts the emulsion into discrete food portions of an aesthetically pleasing size.

Heretofore, these food portions have been gravity fed into a container of hot aqueous solution for cooking and combining with other food ingredients. It has been found that the receiving solution needs to be of a temperature about 50° Fahrenheit higher than the temperature required to coagulate the meat in order to prevent disassociation of the reformed meat portions.

One disadvantge of this process is that there has been a tendency for the food emulsion particularly in the case of meat, to clog the perforations of the extruder plate, causing the food to cease its advance through the plate. Production must then halt while the extruder mechanism is disassembled to clean the plate. The need to eliminate this inefficient and expensive unclogging procedure has been recognized. One aspect of the present invention involves use of dual cutting knives to solve this problem. While in other contexts cutting knives have been provided on both the inside and the outside surfaces of the extruder plate, such features have not addressed the problems associated with the reforming of food portions from a food emulsion.

Problems have also arisen in the transportation of the reformed food portions from the outside surface of the extruder plate to the cooking solution. It is normal for the reformed portions to congregate for a period in the area at the outside surface of the extruder plate, thereby causing the portions to agglomerate or to adhere to surfaces of the mechanism. The food portions are sticky and delicate. Their adherence either to one another or to the exterior knife assembly can cause them to lose their size uniformity or to disintegrate entirely.

SUMMARY OF THE INVENTION

The present invention provides a food extruder which includes a perforated extruder plate having rotary grinding knives biased against both its inside and its outside surfaces. In addition, the outside surface of the extruder plate and its outside knife are both contained within a watertight housing having a fluid inlet and a fluid outlet. The inside surface of the extruder plate and its associated rotary knife are encapsulated in a chamber which is used to receive food under pressure and to direct that food toward the extruder plate.

In use, the food, such as a meat emulsion, which is desired to be formed into discrete edible portions is fed into the food chamber where it is cut by the interior rotary knife prior to its passing through the perforations of the extruder plate. Upon exit from the extruder plate, the second knife cuts the food into portions of a discrete size. The size and shape of these reformed portions can be controlled by adjusting the size and shape of the perforations in the extruder plate, the number and size of the blades on the exterior knife, the rate of rotation of the exterior knife, and the flow rate of the meat emulsion through the plate.

The fluid housing encapsulating the exterior surface of the extruder plate acts to direct moving fluid past the extruder. Reformed food portions of the desired size are thus continually caught up in the flow of this fluid and are carried away in a slurry to the next stage of processing, which may include adding other ingredients, packing or the like. As in the prior art, the fluid which receives the reformed food portions may be heated so that the food will start the cooking process immediately upon extrusion.

FEATURES AND ADVANTAGES

An object of this invention is to improve the process of preparing ready-to-eat foods by the extrusion and liquid submersion method. Accordingly, the fluid housing disclosed allows the food to be extruded into a dynamic, as opposed to a static, heated solution. Since the housing allows the receiving solution to flow past the extruder plate at a constant rate, the food portions are effectively prevented from congregating in a dense mass in the vicinity of the exterior surface of the plate and the exterior knife assembly. Thus, the advantage of the slurry produced by the mechanism of the present invention is that the uniform size of the food portions thus formed is not destroyed by their adherence to one another or to the exterior knife assembly.

Another object of the present invention is to eliminate the production interruptions heretofore caused by the clogging of the perforations of the extruder plate. This phenomenon is caused, for example, by the continuous entrapment of meat fibers in the entrance to the extruder perforations subsequently reducing the flow area of the perforations and causing eventual plugging. By adding a second rotary knife biased against the interior surface of the extruder plate, this phenomenon can be largely eliminated. As the cutting edges of the interior knife sweep past the openings of the perforations, any fibers lodged therein are cut allowing them to freely move through the perforation. In this manner, clogging of the extruder plate is greatly reduced and the necessity for repeatedly halting production to clean the plate is virtually eliminated.

Other novel features which are characteristic of the invention, as to organization and method of operation, together with further objects and advantages thereof will be better understood from the following description considered in connection with the accompanying drawing in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a part schematic, part sectional side elevation of an embodiment of the food extruder of my invention;

FIG. 2 is sectional view taken along the plane of line 2—2 of FIG. 1, showing the extruder plate, the exterior knife and a portion of the interior knife.

DESCRIPTION OF THE PREFERRED EMBODIMENT

The invention will be described with respect to an embodiment which functions as a meat portion maker, although it is to be understood that the invention is readily suited for use in the preparation of other foods as well.

Referring to FIG. 1, there is shown therein a food portion maker or extruder generally designated as 50. Basically, the food portion maker 50 comprises an extruder plate 40 sandwiched between a meat chamber 30 and a fluid housing 10. Biased against the interior surface 43 of the extruder plate 40 is an interior rotary knife 32 and biased against the exterior surface 44 is an exterior rotary knife 14. The food portion maker may be secured in place by means of mounting brackets 37.

Nuts 23 and bolts 24 connect the fluid housing 10 to the meat chamber 30 and seal the extruder plate 40 between them. The nut 23 and bolt 24 arrangement allows ready access to the interior of the food portion maker 50 for cleaning and service. Wing nuts 21 and bolts 22 connect a fluid housing cover 20 to the fluid housing 10. An O-ring 42 insures a watertight seal. The fluid housing cover 20 is provided with a fluid inlet 11 and a fluid and portion outlet 12. The latter are also provided with grooves 25, 26 for providing a watertight seal, by means of O-rings, to a fluid distribution assembly (not shown).

A motor power source is connected to the interior of the meat chamber 30 by passing its motor shaft 36 through a plastic seal 39. The motor shaft 36 is in turn connected to a drive shaft 33 which rotates interior knife 32 and exterior knife 14. Drive shaft 33 has a shoulder 35 which abuts a lip 34 of the interior rotary knife 32. The drive shaft 33 then passes through a correspondingly shaped aperture in the extruder plate 40 and terminates with a nut 17 and a washer 16. The nut 17 and washer 16 hold in place a heavy duty spring 15 which abuts a lip 18 on the exterior rotary knife 14. As can readily be seen from FIG. 1, the force of the spring 15 biases the exterior knife 14 against the exterior surface 44 of the extruder plate 40. This action correspondingly draws the shoulder 35 of the drive shaft 33 toward the spring 15, causing the interior knife 32 to be biased against interior surface 43 of the extruder plate 40.

In use, as shown schematically in FIG. 1, meat or other food is force fed into meat inlet 38, shown threaded for connection to a feeding appartus (not shown). The conical configuration of the meat chamber 30 facilitates the flow of meat along a direction indicated by arrow 31.

The pressure of the force feeding operation drives the meat against the interior surface 43 of the extruder plate 40. Normally, the food particles then pass through one or more perforations 41. However, should any meat fibers become lodged within the perforations 41, rotation of the interior rotary knife 32 will cause such fibers to be severed by a cutting edge 46 of the interior knife 32. The portion of the fiber remaining in the perforation 41 then becomes free and is readily pushed through the perforation by meat particles advancing behind it. The severed portion of the fiber will be swept by interior knife 32 to the area of a new perforation 41 wherein it will either be of a size freely able to pass through the perforation 41 or will be repeatedly severed until it is able to do so. In this manner, blockage of the extruder plate 40 in the vicinity of its interior surface 43 is greatly reduced, virtually eliminating the need for repeatly halting production to disassemble the food portion maker 50 for cleaning of the extruder plate 40.

Perforations 41 mold the food, in this case meat emulsion, into a desired shape and size. Upon exiting from the exterior surface 44 of the extruder plate 40, the food has assumed the shape cylindrical "strands". However, the extruded strands are immediately severed by cutting edges 45 of the exterior rotary knife 14 as it is driven across the exterior surface 44 of the extruder plate 40 by the drive shaft 33.

FIG. 2 shows the manner in which food portions 48 are reformed by this process. For purposes of clarity, only one food portion 48 thus formed is shown. Clearly, the shape and the size of the cross section of a typical food portion 48 will be determined by the cross section of the perforations 41, although this shape and size may be altered somewhat by subsequent processing such as cooking. The length of a food portion 48 is a function of the rate and pressure at which meat is being forced through the meat inlet 38, the rate of speed of rotation of exterior knife 14 (the direction of its rotation being indicated by arrow 47 in FIG. 2), and the number of cutting edges 45 disposed on the exterior knife 14. When a "meat ball" product is desired, by adjusting the above factors, it is possible to impart a cylindrical shape to the food portion 48 which will, upon cooking, become roughly spherical. Other shapes and sizes, such as stars or other figures, are readily achievable through simple adjustment of the shape and size of the cross section of the perforations 41.

Throughout this process, fluid from a fluid source is entering the fluid inlet 11 located on the fluid housing cover 20 of the fluid housing 10. This fluid may be heated so as to begin the process of cooking the food portions 48 immediately upon their extrusion. In the case of meat, it has been found desirable to heat the fluid to a temperature of at least about 50° Fahrenheit higher than the temperature required to coagulate the meat. This prevents disassociation of the food portions 48 after extrusion.

Fluid entering the fluid inlet 11 is constrained by the fluid housing 10 to travel past the exterior knife assembly 13, thereby gathering into suspension the food portions 48 immediately after their extrusion. This suspension, or "slurry", then exits through the fluid and portion outlet 12 for conveyance to a particle separator which drains the fluid. In some applications, such as soups and stews, it will obviously be desirable to allow the fluid to remain in the finished product.

By adjusting the rate of flow of the fluid it is possible to minimize congestion of the food portions 48 in the area of the exterior knife assembly 13. This reduces or eliminates adhesion of the food portions 48 either to one another, to the exterior knife assembly 13, or to other components of the food portion maker 50.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A food extruder including:
   an extruder plate having an inside surface, and outside surface and at least one perforation between the surfaces;
   means for advancing food toward the inside surface of the extruder plate and through the perforations in the extruder plate;
   means adjacent a surface of the extruder plate for cutting the food as it passes through the perforation;
   means for propelling a fluid past the outside surface of the extruder plate to carry the cut food away from the extruder plate;
   the fluid propelling means including a housing mounted to overlie the outside surface of the extruder plate, the housing having a fluid inlet and a fluid and portion outlet, whereby a fluid path from the inlet, across the outside surface of the extruder plate, and through the outlet is provided; and
   means for heating said fluid.

2. A food extruder including:
   an extruder plate having an inside surface, an outside surface and at least one perforation between the surfaces;
   means for advancing food toward the inside surface of the extruder plate and through the perforations in the extruder plate;
   first means adjacent the inside surface of the extruder plate for cutting the food as the food advances into the perforations;
   second means adjacent the outside surface of the extruder plate for cutting the food into discrete food portions as the food advances through said perforations;
   means for heating a liquid; and
   means for propelling said heated liquid past the outside surface of the extruder plate to carry the food portions away from the extruder plate.

3. The food extruder of claim 2 wherein:
   the liquid propelling means includes a housing mounted to overlie the outside surface of the extruder plate, the housing having a fluid inlet and a fluid and portion outlet, whereby a fluid path from the inlet, across the outside surface of the extruder plate, and through the outlet, is provided.

4. The food extruder of claim 2 wherein:
   the first and second cutting means are rotary knives each having at least one cutting edge.

5. The food extruder of claim 4 and further including:
   means for biasing the cutting edges of the rotary knives against the respective surfaces of the extruder plate.

6. The food extruder of claim 1 or 2 wherein:
   the food advancing means comprises an enclosed chamber mounted to overlie the inside surface of the extruder plate, the chamber having a food inlet and adapted to receive food under pressure through the food inlet and to channel the food toward the inside surface of the extruder plate for passage through the perforations.

7. The food extruder of claim 1 wherein said propelling means includes heated liquid propelling means.

8. A food extruder including:
   an extruder plate having an inside surface, an outside surface and at least one perforation between the surfaces;
   a drive shaft passing through the extruder plate;
   first and second rotary knives mounted to the drive shaft, each rotary knife having at least one cutting edge, the cutting edges of the first and second knives mounted adjcent the inside and outside surfaces of the extruder plate, respectively;
   means for biasing the cutting edges of the first and second knives against the respective surfaces of the extruder plate, the biasing means including a spring mounted to the drive shaft abutting the second knife and a shoulder on the drive shaft abutting the first knife, the first and second knives captured between the shoulder and the spring, whereby the spring biases the cutting edges of the second knife against the outside surface of the extruder plate and the shoulder biases the cutting edges of the first knife against the inside surface of the extruder plate;
   means for advancing food toward the inside surface of the extruder plate and through the perforations of the extruder plate;
   means for rotating the drive shaft and the first and second knives therewith, whereby the rotation of the first knife prevents the food from ceasing to advance through the inside surface of the extruder plate and the rotation of the second knife cuts the food advancing through the outside surface of the extruder plate into discrete food portions; and
   means for propelling a fluid across the outside surface of the extruder plate to carry the food portions away from the extruder plate.

9. A food extruder including:
   an extruder plate having an inside surface, and outside surface and at least one perforation between the surfaces;
   a drive shaft passing through the extruder plate;
   first and second rotary knives mounted to the drive shaft, each rotary knife having at least one cutting edge, the cutting edges of the first and second knives mounted adjacent the inside and outside surfaces of the extruder plate, respectively;
   means for biasing the cutting edges of the first and second knives against the respective surfaces of the extruder plate;
   means for advancing food toward the inside surface of the extruder plate and through the perforations of the extruder plate;
   means for rotating the drive shaft and the first and second knives therewith, whereby the rotation of the first knife prevents the food from ceasing to advance through the inside surface of the extruder plate and the rotation of the second knife cuts the food advancing through the outside surface of the extruder plate into discrete food portions; and
   means for propelling a liquid across the outside surface of the extruder plate to carry the food portions away from the extruder plate.

* * * * *